(12) United States Patent
La Placa

(10) Patent No.: US 12,227,130 B2
(45) Date of Patent: Feb. 18, 2025

(54) MOTOR VEHICLE

(71) Applicant: MERCEDES-BENZ GROUP AG, Stuttgart (DE)

(72) Inventor: Giovanni La Placa, Ludwigsburg (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/708,505

(22) PCT Filed: Oct. 11, 2022

(86) PCT No.: PCT/EP2022/078236
§ 371 (c)(1),
(2) Date: May 8, 2024

(87) PCT Pub. No.: WO2023/083543
PCT Pub. Date: May 19, 2023

(65) Prior Publication Data
US 2025/0018860 A1    Jan. 16, 2025

(30) Foreign Application Priority Data
Nov. 9, 2021   (DE) .................. 10 2021 005 528.4

(51) Int. Cl.
*B60Q 3/70*   (2017.01)
*B60Q 3/50*   (2017.01)
*B60Q 3/60*   (2017.01)

(52) U.S. Cl.
CPC ............. *B60Q 3/70* (2017.02); *B60Q 3/50* (2017.02); *B60Q 3/60* (2017.02)

(58) Field of Classification Search
CPC ............. B60Q 3/50; B60Q 3/60; B60Q 3/70
See application file for complete search history.

(56) References Cited

U.S. PATENT DOCUMENTS

| 2009/0290368 A1* | 11/2009 | Iwai .......... B60Q 3/68 362/490 |
| 2014/0168608 A1* | 6/2014 | Disley .......... G03B 29/00 352/132 |
| 2018/0086260 A1 | 3/2018 | Barillot et al. |

FOREIGN PATENT DOCUMENTS

| CN | 112078344 A | 12/2020 |
| DE | 10226451 C1 | 7/2003 |

(Continued)

OTHER PUBLICATIONS

International Search Report and Written Opinion mailed Jan. 24, 2023 in related/corresponding International Application No. PCT/EP2022/078236.

(Continued)

*Primary Examiner* — Thomas M Sember
(74) *Attorney, Agent, or Firm* — PATENT PORTFOLIO BUILDERS PLLC

(57) ABSTRACT

A motor vehicle has projection unit that includes comprises a projection surface and a projector and is designed in such a way that in a normal situation, a light signal can be projected onto an illumination area of the projection surface by the projector. The illumination area of the projection surface is at least partially represented by a light-reflecting roof area of the motor vehicle. The projection surface has a transparent glass area. The projection unit is designed in such a way that in an emergency situation, the light signal can be projected towards the outside through the glass area by the projector and the motor vehicle can be recognized from the outside.

9 Claims, 1 Drawing Sheet

(56) References Cited

FOREIGN PATENT DOCUMENTS

Figure 1:
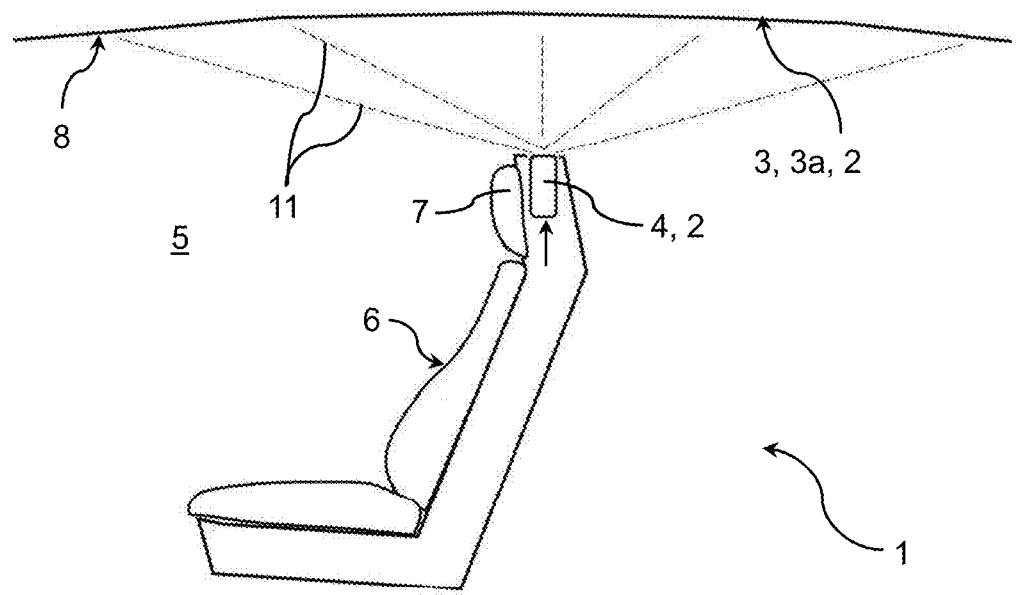

| | | |
|---|---|---|
| DE | 102006035522 A1 | 2/2008 |
| DE | 102007049922 A1 | 4/2009 |
| DE | 102017127257 A1 | 5/2019 |
| DE | 102018201766 A1 | 8/2019 |
| DE | 202020106986 U1 | 1/2021 |
| DE | 102020102742 A1 | 8/2021 |
| DE | 102020124649 A1 | 3/2022 |
| FR | 3056801 A1 | 3/2018 |
| WO | 2017073250 A1 | 5/2017 |

OTHER PUBLICATIONS

Office Action created Apr. 25, 2022 in related/corresponding DE Application No. 10 2021 005 528.4.

\* cited by examiner

MOTOR VEHICLE

BACKGROUND AND SUMMARY OF THE INVENTION

Exemplary embodiments of the invention relate to a motor vehicle having an interior and a projection unit arranged in the interior, to the projection unit for the motor vehicle having a projection surface and at least one projector, and to a method for controlling the projection unit.

Currently, so-called ambient lighting is becoming increasingly common in interiors of motor vehicles. The ambient lighting is typically created by means of LEDs and is installed in the region of the dashboard, the center console and the door coverings.

An interaction arrangement having a plurality of projectors for multiple users is known from DE 20 2020 106 986 U1. Here, each projector is assigned a projection unit and each user is assigned a user interface.

Furthermore, an apparatus for generating a volume rendering outside of a motor vehicle is known from DE 10 2020 124 649 A1. Here, the apparatus has a laser arrangement with which the material can be excited outside the motor vehicle.

Furthermore, a lighting device with display modules is known from DE 10 2020 102 742 A1. By means of the lighting device, graphical information can be displayed on surface areas of the motor vehicle depending on the driving speed and driving direction.

Furthermore, an industrial truck having an overhead guard is known from DE 10 2017 127 257 A1. The overhead guard has a transparent roof panel in the form of a transparent display for displaying information.

Additionally, it is known from DE 102 26 451 C1 to illuminate a roof area facing towards the interior by means of a projection unit.

Exemplary embodiments of the invention are directed to an improved or at least alternative embodiment for a motor vehicle of the generic type, by which in particular the disadvantages known from the prior art are overcome. Exemplary embodiments of the invention are also directed to an improved projection unit for the motor vehicle and a method for controlling the projection unit.

The present invention is based on the general idea of using a projection unit of the motor vehicle to also illuminate the motor vehicle in an emergency situation, thereby making the motor vehicle visible to a rescue service.

A generic motor vehicle has an interior and a projection unit arranged in the interior. The projection unit has a projection surface and at least one projector. In this case, the projection unit is designed in such a way that in a normal situation, a light signal can be projected onto a light-reflecting illumination area of the projection surface by means of the at least one projector. The illumination area of the projection surface is represented at least partially by a light-reflecting roof surface of the motor vehicle facing towards the interior. According to the invention, the projection surface has an outwardly transparent glass area. Additionally, the projection unit is designed in such a way that in an emergency situation, the light signal can be projected towards the outside through the glass area by means of the at least one projector and the motor vehicle can be recognized from the outside. It is understood here that the light signal can differ in the emergency situation from the light signal in the normal situation.

In the normal situation, the projection unit can provide ambient lighting or full lighting of the motor vehicle by projecting the light signal onto the illumination area of the projection surface. The illumination area is light-reflecting, so that the light signal propagates from the at least one projector to the illumination area and then is reflected by the illumination area into the interior. As a result, the interior is indirectly illuminated, and a glare effect can be avoided. The illumination area can be represented by the entire roof surface, for example, as a result of which the entire interior is uniformly illuminated. In order to enhance the light-reflecting effect of the illumination area, the roof surface can be coated with a light-reflecting coating.

However, the glass area is transparent, meaning that the light signal can exit outwards through the glass area. In an emergency situation, the projection unit can therefore radiate the light signal outwards through the glass area of the projection surface and thereby make the motor vehicle recognizable to a rescue service-such as a rescue helicopter for example. Therefore, the projection unit can not only provide ambient lighting or full lighting of the motor vehicle, but can also provide the safety function in the motor vehicle.

In an advantageous embodiment of the motor vehicle, it can be provided that the roof surface is formed at least partially by a transparent panoramic area and a shading means closing the panoramic area. Alternatively, it can be provided that the roof surface has a transparent glass sunroof instead of the transparent panoramic area. The panoramic area or the glass sunroof of the roof surface then represents the glass area of the projection surface and the shading means then at least partially represents the illumination area of the projection surface. For this purpose, the shading means can be designed facing towards the interior and also to be light-reflecting. In the emergency situation, the shading means is then automatically opened, and the light signal can be projected towards the outside through the panoramic area or the glass sunroof by means of the at least one projector. In other words, in the emergency situation, the shading means is automatically retracted and the glass area, i.e., the panoramic area or the glass sunroof, is opened. Then the light signal is transmitted towards the outside through the glass area. As a result, the motor vehicle involved in the accident or emergency can be recognized better from the outside, thanks to the light signal.

Alternatively, or additionally, it can be provided that the motor vehicle has at least one transparent side window. The side window of the motor vehicle then represents the glass area of the projection surface. In the emergency situation, the light signal can then be projected towards the outside through the side window by means of the at least one projector. Therefore, in the emergency situation the motor vehicle can also be laterally lit and therefore also better recognized from the side. To illuminate the side window, the at least one projector can be arranged or mounted or fixed in the motor vehicle so as to be moveable, e.g., pivotable and/or displaceable. In particular, the at least one projector can be moved by an electric motor. In the emergency situation, the at least one projector can be moved to the side window of the motor vehicle and the light signal is transmitted towards the outside through the side window.

In an advantageous embodiment of the motor vehicle, the projection unit can have a sensor unit with at least one pre-crash sensor and/or at least one crash sensor. The projection unit can recognize the emergency situation by way of the sensor unit and the transmission or radiation of the light signal can start through the glass area. Alternatively, or additionally, the projection unit can have an emergency call switch for manually flagging the emergency situation.

With the emergency call switch, an occupant of the motor vehicle can manually notify the projection unit of the emergency situation at any time. In particular, the emergency call switch can be activated if the motor vehicle is in an emergency situation that is not a crash.

In an advantageous embodiment, it is provided that the motor vehicle has at least one front seat. The front seat can advantageously be an integral seat. The respective projector is then installed in the respective front seat. In this case, the respective projector is preferably installed in a head support or in the region of a head support of the respective front seat. In particular, the motor vehicle can have two front seats and the projection unit can have two projectors.

In the normal situation, the light signal can be formed by illuminating the illumination area of the projection surface with a static colored light and/or with a static white light. In particular, the complete illumination area—in particular, the complete roof surface—can thus be completely illuminated. The light signal can be dimmed or adapted in its intensity. Additionally, the color of the light signal can be adjusted or changed. Alternatively, in the normal situation the light signal can be formed by projecting at least one pattern and/or at least one graphic onto the illumination area of the projection surface. It is also conceivable that, in the normal situation, the light signal is formed by projecting at least one animation and/or at least one temporally changing pattern and/or at least one temporally changing graphic onto the illumination area of the projection surface. In the normal situation, the projection unit can therefore project any pattern or graphics onto the illumination area or onto the roof surface of the motor vehicle. The light signal can also be combined here with gaming on a paired smart phone or with an integrated screen or system.

In the emergency situation, the light signal according to the invention is formed by projecting at least one static or temporally changing pattern and/or at least one static or temporally changing graphic onto the glass area of the projection surface. As explained above, the light signal in the emergency situation can deviate from the light signal in the normal situation.

The invention also relates to a method for controlling the projection unit of the motor vehicle described above. In this case, in an emergency situation, a light signal is projected towards the outside through a glass area of a projection surface of the projection unit by means of a projector of the projection unit and the motor vehicle can thus be recognized from the outside. The invention also relates to a projection unit for the motor vehicle described above. The projection unit has a projection surface and at least one projector. In order to avoid repetitions, reference is made to the above explanations with regard to the embodiment of the projection unit and the motor vehicle.

Further important features and advantages of the invention result from the dependent claims, the drawings, and the associated figure description according to the drawings.

It is understood that the aforementioned features and the features to be explained in the following can not only be used in the respectively specified combination, but also in other combinations or in isolation without leaving the scope of the present invention.

Preferred exemplary embodiments of the invention are represented in the drawings and are explained in more detail in the following description, wherein the same reference signs refer to identical or similar or functionally identical components.

BRIEF DESCRIPTION OF THE DRAWING FIGURES

Figure 2:
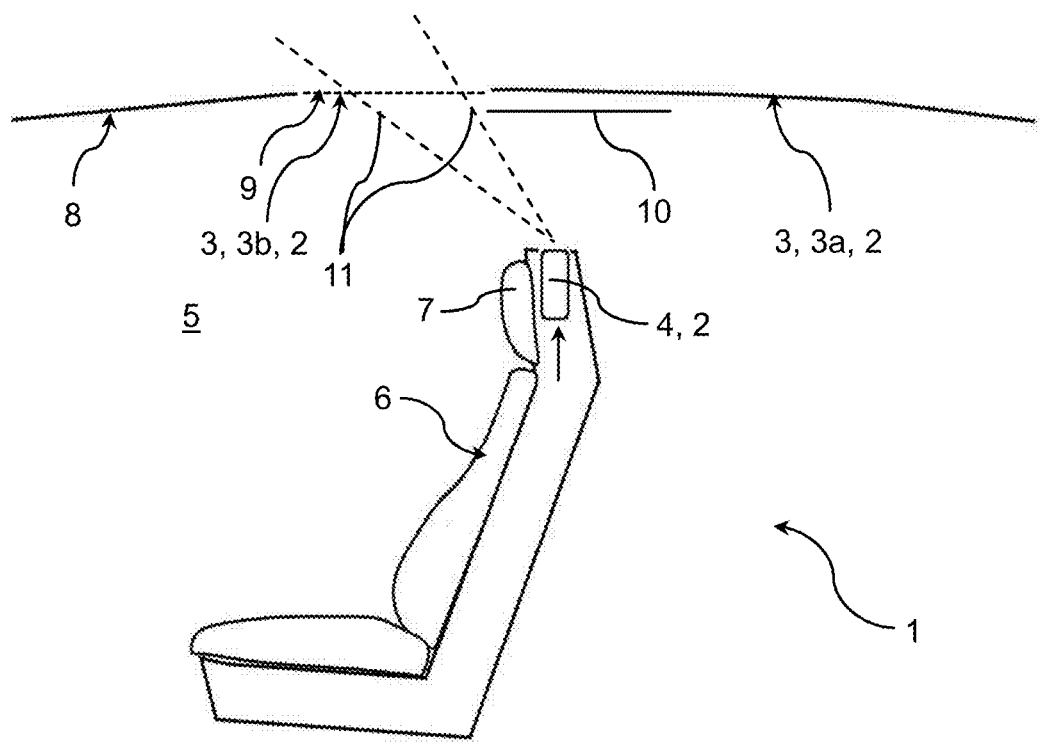

Here:

FIG. 1 schematically shows a view of a motor vehicle according to the invention in a normal situation, FIG. 2 schematically shows a view of a motor vehicle according to the invention in an emergency situation.

DETAILED DESCRIPTION

FIG. 1 shows a motor vehicle 1 according to the invention in a normal situation. FIG. 2 shows the motor vehicle 1 according to the invention in an emergency situation. The motor vehicle 1 has a projection unit 2 with a projection surface 3 and a projector 4. Additionally, the motor vehicle 1 has an interior 5, wherein a front seat 6 with a head support 7 and a roof surface 8 are arranged in the interior 5. The roof surface 8 is in this case—as can be seen in FIG. 2—partially formed by a transparent glass sunroof 9 and a shading means 10 for closing the glass sunroof 9. The projector 4 of the projection unit 2 is installed in the head support 7 of the front seat 6 so as to be adjustable by an electric motor—as indicated with the arrow.

The projection surface 3 of the projection unit 2 is represented by an illumination area 3a and a glass area 3b. The illumination area 3a is light-reflecting and formed by the roof surface 3 and in particular by the shading means 10. In order to enhance the light-reflecting effect of the illumination area 3a, the roof surface 3 and the shading means 10 can be coated with a light-reflecting coating. The glass area 3b is transparent and is formed here by the glass sunroof 9—indicated schematically here with dotted lines.

In reference to FIG. 1, in a normal situation the projection unit 2 projects a light signal 11—schematically indicated here with broken lines—onto the illumination area 3a by means of the projector 4. As the illumination area 3a is light-reflecting, the light signal 11 is reflected back and the interior 5 is illuminated without any glare. The light signal 11 can be formed by a static colored light and/or a static white light and uniformly illuminate the interior 5. Alternatively, the light signal 11 can be formed by projecting at least one static or temporally changing pattern and/or at least one static or temporally changing graphic.

In reference to FIG. 2, in an emergency situation the shading means 10 is automatically opened and the projection unit 2 projects the light signal 11—schematically indicated here with broken lines—onto the glass area 3b. As the glass area 3b is transparent, the light signal 11 is visible from the outside. Therefore, the motor vehicle 1 is easily recognizable from the outside by a rescue service—such as for example a rescue helicopter. According to the invention, the light signal 11 is formed by projecting at least one static or temporally changing pattern and/or at least one static or temporally changing graphic.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A motor vehicle comprising:
   an interior;
   a projection unit arranged in the interior and having a projection surface and at least one projector,
   wherein the projection unit is configured such that in a normal situation, a light signal is projected onto a light-reflecting illumination area of the projection surface by the at least one projector,
   wherein the illumination area of the projection surface at least includes a light-reflecting roof surface of the motor vehicle facing towards the interior,
   wherein the projection surface has an outwardly transparent glass area,
   wherein the projection unit is configured such that in an emergency situation, the light signal is projected towards an outside of the vehicle through the outwardly transparent glass area by the at least one projector, and the motor vehicle is recognizable from the outside,
   wherein, in the emergency situation, the light signal is formed by projecting at least one static or temporally changing pattern or at least one static or temporally changing graphic onto the outwardly transparent glass area of the projection surface.

2. The motor vehicle of claim 1, wherein
   the roof surface is formed at least partially by a transparent panoramic area or by a transparent glass sunroof and a shade closing the panoramic area or the transparent glass sunroof,
   the panoramic area or the transparent glass sunroof of the roof surface are the outwardly transparent glass area of the projection surface and the shade at least partially represents the illumination area of the projection surface, and
   in the emergency situation, the shade is automatically opened, and the light signal is projected towards the outside through the panoramic area or the transparent glass sunroof by the at least one projector.

3. The motor vehicle of claim 1, further comprising:
   at least one side window, wherein the at least one side window of the motor vehicle is the outwardly transparent glass area of the projection surface, and
   wherein, in the emergency situation, the light signal is projected towards the outside through the side window by the at least one projector.

4. The motor vehicle of claim 3, wherein the at least one projector is arranged in the motor vehicle so as to be moveable, and wherein, in the emergency situation the at least one projector is moveable to the side window of the motor vehicle.

5. The motor vehicle of claim 1, wherein the projection unit has
   a sensor unit with at least one pre-crash sensor or at least one crash sensor configured to recognize the emergency situation, or
   an emergency call switch configured to manually flag the emergency situation.

6. The motor vehicle of claim 1, further comprising:
   at least one front seat, wherein the at least one projector is installed in the at least one front seat in a head support or in a region of a head support of the at least one front seat.

7. The motor vehicle of claim 1, wherein, in the normal situation, the light signal is formed by
   illuminating the illumination area of the projection surface with a static colored light or with a static white light, or
   projecting at least one static or temporally changing pattern or at least one static or temporally changing graphic onto the illumination area of the projection surface.

8. A method for controlling a projection unit of a motor vehicle arranged in an interior of the motor vehicle, the method comprising:
   projecting, by the projection unit in a normal situation, a light signal onto a light-reflecting illumination area of a projection surface of the projection unit by at least one projector of the projection unit, wherein the illumination area of the projection surface at least includes a light-reflecting roof surface of the motor vehicle facing towards the interior, wherein the projection surface has an outwardly transparent glass area; and
   projecting, by the projection unit in an emergency situation, the light signal towards an outside of the vehicle through the outwardly transparent glass area by the at least one projector, and the motor vehicle is recognizable from the outside,
   wherein, in the emergency situation, the light signal is formed by projecting at least one static or temporally changing pattern or at least one static or temporally changing graphic onto the outwardly transparent glass area of the projection surface.

9. A projection unit for the motor vehicle, the projection unit comprising:
   a projection surface; and
   at least one projector,
   wherein the projection unit is configured such that in a normal situation, a light signal is projected onto a light-reflecting illumination area of the projection surface by the at least one projector,
   wherein the illumination area of the projection surface at least includes a light-reflecting roof surface of the motor vehicle facing towards the interior,
   wherein the projection surface has an outwardly transparent glass area,
   wherein the projection unit is configured such that in an emergency situation, the light signal is projected towards an outside of the vehicle through the outwardly transparent glass area by the at least one projector, and the motor vehicle is recognizable from the outside,
   wherein, in the emergency situation, the light signal is formed by projecting at least one static or temporally changing pattern or at least one static or temporally changing graphic onto the outwardly transparent glass area of the projection surface.

* * * * *